United States Patent [19]

Shimada

[11] Patent Number: 5,301,235
[45] Date of Patent: Apr. 5, 1994

[54] ARRANGEMENT FOR TRANSFORMING PLAINTEXT INTO CIPHERTEXT FOR USE IN A DATA COMMUNICATIONS SYSTEM

[75] Inventor: Michio Shimada, Tokyo, Japan
[73] Assignee: NEC Corporation, Japan
[21] Appl. No.: 65,862
[22] Filed: May 21, 1993
[30] Foreign Application Priority Data

May 21, 1992 [JP] Japan ................. 4-128409

[51] Int. Cl.$^5$ ........................ H04K 1/02; H04L 9/18
[52] U.S. Cl. ............................ 380/42; 380/28; 380/50
[58] Field of Search ............... 380/42, 43, 28, 50

[56] References Cited

U.S. PATENT DOCUMENTS

| | | | |
|---|---|---|---|
| 4,134,071 | 1/1979 | Ohnsorge | 380/50 |
| 4,375,579 | 3/1983 | Davida et al. | 380/42 |
| 4,441,095 | 4/1984 | Widmer et al. | 380/42 |
| 4,760,600 | 7/1988 | Nakai | 380/50 |
| 5,008,938 | 4/1991 | Freeburg et al. | 380/50 |

*Primary Examiner*—Gilberto Barrón, Jr.
*Attorney, Agent, or Firm*—Ostrolenk, Faber, Gerb & Soffen

[57] ABSTRACT

A hardware arrangement is provided for transforming plaintext into corresponding ciphertext. The plaintext includes a plurality of words each having a predetermined bit length. The hardware arrangement sequentially acquires the words and exhibits a predetermined number of arithmetic operations on the word acquired. Each of the arithmetic operations includes a plurality of arithmetic processes. The hardware arrangement outputs an enciphered word therefrom when completing the predetermined number of arithmetic operations. A selector is arranged to receive two inputs and selectively output one of the two inputs. One of the two inputs corresponds to the word acquired. A multiplier is coupled to receive the output of the selector. The multiplier multiplies the output of the selector by a multiplier and outputs a product therefrom. An adder is coupled to receive the product. The adder adds the product and an addend and then outputs a sum. A divider is coupled to receive the sum such as to divide the sum by a modulus and outputs a residue therefrom. The value of the modulus is subject to change at each of the arithmetic operations. The residue is applied to the selector as the other of the two inputs.

6 Claims, 3 Drawing Sheets

ARRANGEMENT FOR TRANSFORMING PLAINTEXT INTO CIPHERTEXT FOR USE IN A DATA COMMUNICATIONS SYSTEM

BACKGROUND OF THE INVENTION

1. Field of the Invention

The present invention relates to an arrangement for transforming plaintext into the corresponding ciphertext in a digital data communications system. The arrangement disclosed is also applicable to the reverse process of transforming ciphertext into the original plaintext.

2. Description of the Related Art

In a data communications system, it is a common practice to use cryptographic techniques in order to prevent an unauthorized person(s) from obtaining data. The plaintext to be transmitted is transformed into the corresponding ciphertext. The ciphertext, when received, is subject to the reverse process via which the ciphertext is transformed into the original plaintext.

A cipher is a secret method of writing whereby plaintext (or cleartext) is transformed into the corresponding ciphertext (sometimes called a cryptogram). The process is called encipherment or encryption, while the reverse process of transforming ciphertext into the corresponding plaintext is called decipherment or decryption. Both encipherment and decipherment are controlled by a cryptographic key or keys.

A known encipherment which is currently used, is to linearly transform plaintext M into the corresponding ciphertext C as shown in equation (1):

$$C = a \cdot M + b \bmod N \quad (1)$$

where a, b, and N each is a predetermined integer. As an example, the plaintext M is a data word having a constant bit length. As is well known in the art, "b mod N" implies a residue when "b" is divided by "N".

The ciphertext C can be transformed into the corresponding plaintext using the following equation (2).

$$M = (C - b)/a \bmod N \quad (2)$$

Equation (2) is to determine M which satisfies $$(C - b) - a \cdot M \bmod N$$

For further details reference should be made to a book, entitled "Cryptograph and Data Security" by Dorothy Elizabeth Robling Denning, published by Addison-Wesley Publishing Company (reprinted with corrections, January 1983), pages 43–45.

It the following two values p and q are determined,
p = 1/a mod N
q = −b/a mod N
then the above-mentioned encipherment can be implemented by the linear transformation shown in equation (3).

$$M = p \cdot C + q \bmod N \quad (3)$$

In the conventional linear transformation, either of a and b (or both) is used as a cryptographic key, while N is a given constant value selected from values which may appear in the plaintext. The linear transformation can easily be processed and thus has been utilized for a long time.

However, given a plurality of plaintext-ciphertext pairs (M(1), C(1)), ..., (M(L), C(L)), then the keys a and b can be determined by solving the following linear equations (4A)–(4L).

$$C(1) = M(1) \cdot a + b \bmod N \quad (4A)$$

$$C(L) = M(L) \cdot a + b \bmod N \quad (4L)$$

In this case, breaking the cipher is not difficult.

Further, the cipher is particularly vulnerable if a cryptanalyst is able to input plaintext to an encipher and observe the changes in the resulting ciphertext. In this case, the residues of "a mod N" and "b mod N" can be determined without any difficulty by calculating the following equations:

C = b mod N (M = 0)
C = a + b mod N (M − 1)

Even if all the values a, b, and N in the equation C = a·M + b mod N are utilized as keys, the cipher is breakable in the case where a cryptanalyst is able to input plaintext and then observe the ciphertext thus obtained. In this case, the residues of "a mod N" and "b mod N" are first determined using the above-mentioned proccesses. Subsequently, the greatest common measure of a·M(j) + b − C(j) (j = 1, ..., L) is calculated. In more specific terms, the difference between C and "a·M + b" is a multiple of N, and as such, if the greatest common measure regarding arbitrary plaintext-ciphertext pairs are determined, then the greatest common measure is equal to "N". For details reference should be made to the above-mentioned book, pages 66–67.

In order to overcome the drawbacks inherent in the encipherment using linear transformation, a Data Encryption Standard (DES) using non-linear transformation has been proposed. Although the non-linear transformation is capable of rendering cryptanalysis much more difficult, it requires a very large look-up table stored in a read-only-memory (ROM) which renders the arrangement bulky and tends to lower the transmission rate. For further details of the DEC, reference should be made to the above-mentioned book, pages 90–101.

As mentioned above, the encipher arrangement using the conventional liner transformation has encountered the drawback that the keys can easily be solved if arbitrary plaintext-ciphertext pairs be available.

Further, the DEC using non-linear transformation is able to render cryptayalysis difficult but it suffers from complicate hardware arrangement and low transmission rate.

SUMMARY OF THE INVENTION

It is an object of the present invention to provide an arrangement which is able to attain a high speed encipherment using linear transformation while maintaining the cipher computationally unbreakable.

More specifically, an aspect of the present invention resides in a hardware arrangement for transforming plaintext into corresponding ciphertext, the plaintext including a plurality of words each having a predetermined bit length, the hardware arrangement sequentially acquiring the words and exhibiting a predetermined number of arithmetic operations on the word acquired, each of the arithmetic operations including a plurality of arithmetic processes, the hardware arrangement outputting an enciphered word therefrom when completing the predetermined number of arithmetic operations, the hardware arrangement comprising: first means arranged to receive first and second inputs and selectively output one of the first and second inputs, the first input corresponding to the word acquired; second means coupled to receive the output of the first means, the second means multiplying the output of the first means by a multiplier and outputting a product therefrom; third means coupled to receive the product, the third means adding the product and an addend and then outputting a sum; and fourth means coupled to receive the sum, the fourth means dividing the sum by a modulus and outputting a residue therefrom, the value of the modulus being subject to change at each of the arithmetic operations, the residue being applied to the first means as the second input, the residue being outputted from the hardware arrangement as the ciphered word when the predetermined number of arithmetic operations are completed.

A further aspect of the present invention resides in a hardware arrangement for transforming plaintext into corresponding ciphertext, the plaintext including a plurality of words each having a predetermined bit length, the hardware arrangement sequentially acquiring the words and exhibiting a predetermined number of arithmetic operations on the word acquired, each of the arithmetic operations including a dividing operation, the hardware arrangement outputting an enciphered word therefrom when completing the predetermined number of arithmetic operations, the hardware arrangement comprising: first means arranged to receive first and second inputs and selectively output one of the first and second inputs, the first input corresponding to the word acquired; second means coupled to receive the output of the first means, the second means changing a value of the output of the first means, the changing including an operation that the value of the output of the first means is rendered smaller than a modulus used in the dividing operation, the second means outputting an output of the value changed; third means coupled to receive the output of the second means, the third means multiplying the output of the second means by a multiplier and outputting a product therefrom; fourth means coupled to receive the product, the third means adding the product and an addend and then outputting a sum; fifth means coupled to receive the sum, the fourth means dividing the sum by the modulus and outputting a residue therefrom, the value of the modulus being subject to change at each of the arithmetic operations; sixth means coupled to compare the output of the second and the modulus, the sixth means outputting a control signal whose content varies depending on a result of the comparison; and seventh means coupled to receive the outputs of the second, fourth, and sixth means, the seventh means being arranged to select one of the outputs of the second and fourth means according to the control signal, the seventh means applying the selected output to the first means.

BRIEF DESCRIPTION OF THE DRAWINGS

The features and advantanges of the present invention will become more clearly appreciated from the following description taken in conjunction with the accompanying drawings in which like elements are denoted by like reference numerals and in which.

DETAILED DESCRIPTION OF THE PREFERRED EMBODIMENTS

Figure 1:
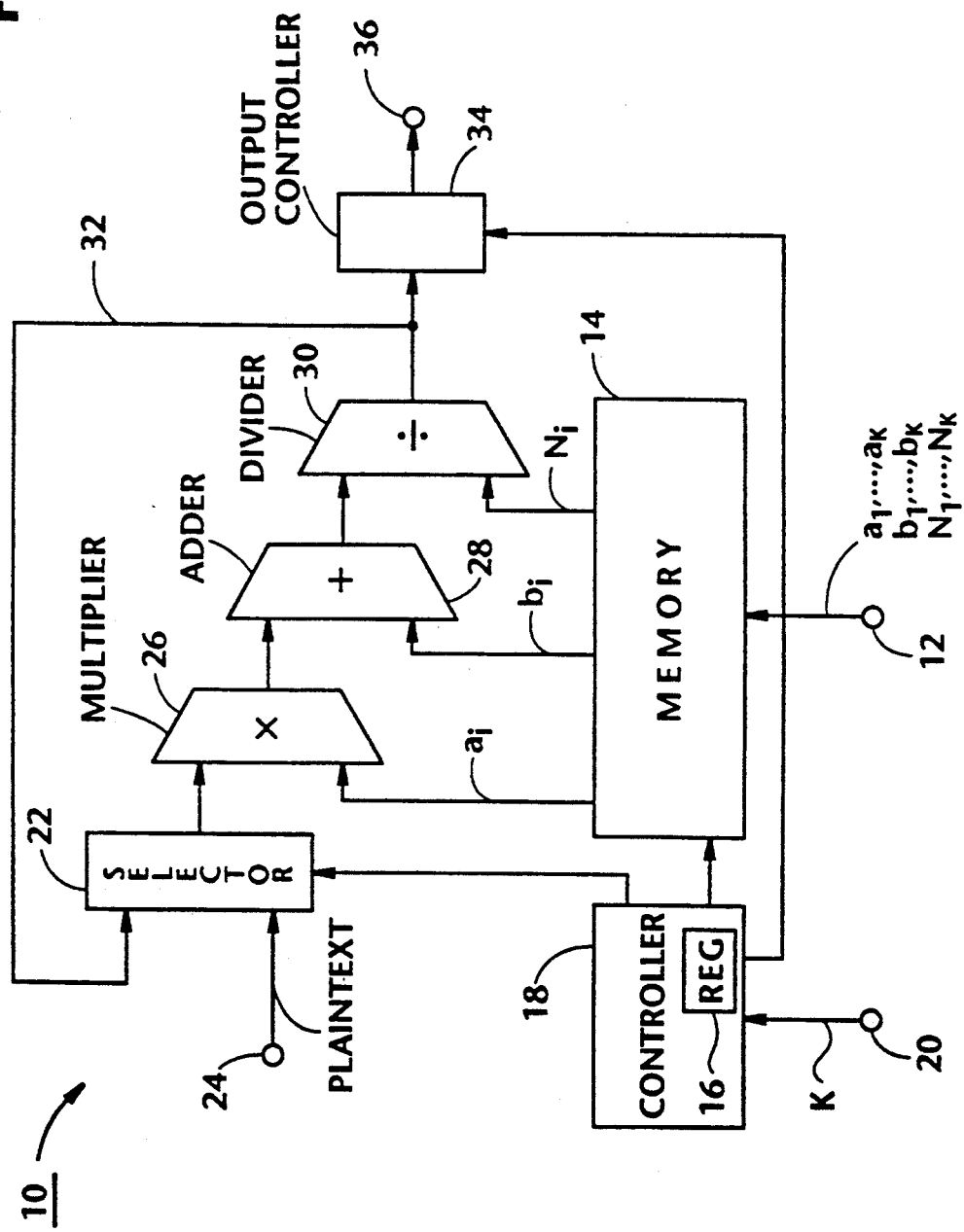
FIG. 1 is a block diagram schematically showing a first embodiment of the present invention.

Before discussing the preferred embodiments of the present invention, an underlying principle thereof will first be described.

According to the conventional encipherment using linear transformation, if a data word of plaintext takes the values of $0, 1, 2, \ldots, (N-1)$, the modulus is set to N. Let us implement repetitively encipherment as shown in equation (5).

$$C = a_k(\ldots(a_2(a_1 \cdot M + b_1 \bmod N) + b_2 \bmod N)\ldots) + b_k \bmod N \quad (5)$$

where $a_1 \ldots a_k$ and $b_1 \ldots b_k$ are cryptographic keys. Equation (5) can be rewritten by $$C = A \cdot M + B \bmod N \quad (6)$$

wherein $$A = a_k \cdot a_{k-1} \ldots a_2 a_1 \bmod N$$

$$B = b_k + \sum_{j=1}^{K-1} b_j \prod_{I=K}^{K-j} a_I \bmod N$$

That is, even if the number of the linear transforms increases, the result is equivalent to that obtained by one linear transformation. In other words, the repeated operations of the above-mentioned linear transformations are unable to render the cryptanalysis difficult.

According to the present invention, each operation of linear transformations is carried out using different moduli in order to render computationally infeasible to break the cipher. In the following discussion, the keys a and b are also changed at each linear transformations. That is, it is within the scope of the present invention that: (a) all the keys a, b, and N are changed at each linear transformation; and (b) only N is changed at each linear transformation.

Designating $x_1, x_2, \ldots, x_{k-1}$ respectively the intermediate results of the above-mentioned repeated operations, equation (5) is rewritten into the following equations (7A), (7J) and (7K).

$$x_1 = a_1 \cdot M + b_1 \bmod N_1 \quad (7A)$$

$$x_j = a_j \cdot x_{j-1} + b_j \bmod N_j (j=2, 3, \ldots, k-1) \quad (7J)$$

$$C = a_k \cdot x_{k-1} + b_k \bmod N_k \quad (7K)$$

The reason why the ciphertext obtained using equations (7A)–(7K) is very difficult to break, will be discussed. Merely for the sake of simplifying the description, it is assumed that $K=2$ (viz., $a_1$, $a_2$, $b_1$, and $b_2$ are fixed). In this instance (viz., $K=2$), the plaintext M (viz., a given data word) is transformed into the corresponding ciphertext C (viz., an enciphered data word) using the following equations (8A) and (8B). It is further assumed that $a_1 = a_2 = a$ and $b_1 = b_2 = b$. Then, $$x = a \cdot M + b \bmod N_1 \quad (8A)$$

$$C = a \cdot x + b \bmod N_2 \qquad (8B)$$

Determining the keys defined by equations (8A) and (8B) is to solve $x(1), \ldots, x(L)$, $N_1$, and $N_2$ using the following congruence equations and inequalities depicted by (9A)-(9F). In this case, it is assumed that a plurality of plaintext-ciphertext pairs of $(M(1), C(1)), \ldots, (M(L), C(L))$ are known.

$$x(1) = a \cdot M(1) + b \bmod N_1 \qquad (9A)$$
$$C(1) = a \cdot x(1) + b \bmod N_2 \qquad (9B)$$
$$x(1) < N_1 \qquad (9C)$$

$$x(L) = a \cdot M(L) + b \bmod N_1 \qquad (9D)$$
$$C(L) = a \cdot x(L) + b \bmod N_2 \qquad (9E)$$
$$x(L) < N_1 \qquad (9F)$$

In general, $x = y \bmod z$ means that the difference between x and y is a multiple of z. In other words, x and y are congruent each other with a modulus z. If $N_1$ and $N_2$ are prime numbers with each other (viz., the minimum common number is 1), then simultaneous congruent equations for $x(j)$ has always a solution. By way of example, these discussions are described on pages 47–48 of the above-mentioned book.

Therefore, it is not possible to determine a solution merely according to equations (9A)-(9F). That is, in order to determine the solution, it is absolutely required to first determine all the combinations of $N_1$ and $N_2$ each of which satisfies the congruence equations (9A), (9B), (9D), and (9E). Following this, the combinations of $N_1$ and $N_2$, which do not satisfy the inequalities (9C) and (9F), are deleted. These operations require approximately the number of calculations which equals $N_1 \cdot N_2$. Thus, if each bit length of $N_1$ and $N_2$ is several tens by way of example, it is computationally infeasible to determine the solution of equations (9A)-(9F).

In the above discussions, it is assumed that $K = 2$ and some plaintext-ciphertext pairs are available. Accordingly, in the case where $K = 2$, it is almost impossible to computationally determine the solution of equations (9A)-(9F).

However, according to the first embodiment, it is necessary that the key N should be selected such as to satisfy $N_1 < N_2 < \ldots < N_k$. This is because if $N_{j+1} < N_j$ in the operations of the j-th and (j+1)-th linear transformations, some integers are undesirably transformed into an identical integer and thus the plaintext is no longer deciphered uniquely.

Reference is now made to FIG. 1, wherein a first embodiment of the present invention is schematically illustrated in block diagram form. It is assumed that the number of repetitive linear transformations is k.

Before plaintext is applied to the arrangement of FIG. 1 (depicted by numeral 10), a plurality of cryptographic keys $(a_1, \ldots, a_k)$, $(b_1, \ldots, b_k)$, and $(N_1, \ldots, N_k)$ are applied to a memory 14 via an input terminal 12 and then stored therein. Further, the number of repetitive operations of linear transformation (k) is applied to a controller 18 via an input terminal 20 and stored in a register 16 provided therein. It is assumed that the plaintext is formed of a plurality of data words each of which has a 64-bit length by way of example. The words are sequentially applied to the arrangement of FIG. 1, after which the word is subject to the k linear transformations.

After these preparation, when one word of the plaintext is applied to a selector 22 via an input terminal 24, the controller 18 allows the selector 22 to apply the word to a multiplexer 26. Further, the controller 18 controls the memory 14 such as to apply $a_1$, $b_1$, and $N_1$ to the multiplier 26, an adder 28, and a divider 30, respectively. In FIG. 1, the suffix "i" attached to "a", "b", and "N" takes sequentially the values of is $1, 2, \ldots, k$ at each linear transformation.

The multiplier 26 multiplies the output of the selector 22 by the key $a_1$, and applies the product to the adder 28. Subsequently, the adder 28 adds the key $b_1$ to the output of the multiplier 26, after which the divider 30 divides the output of the adder 28 by the key $N_1$ and outputs the residue of the dividing operation. The residue thus obtained is routed back to the selector 22 via a line 32 and also applied to an output controller 34. The controller 18 allows the output controller 34 to pass therethrough the residue obtained from the divider 30 only if the number of the repetitive linear transformations reaches "k". In this case, the selector 33 applies, under the control of the controller 18, the output of the divider 30 to the multiplier 26.

In the event that $k > 2$, the above-mentioned "multiplication", "adding", and "division" are repeated wherein the keys $a_2$, $b_2$, and $N_2$ stored in the memory 14 are applied to the multiplier 26, the adder 28, and the divider 30, respectively, in a manner similar to the first case. The output of the divider 30 (viz., residue) is also applied to the multiplier 26 via the selector 22 if $k > 3$.

These operations are repeated until the k-th sequence of calculations using the keys $a_k$, $b_k$, and $N_k$ is completed. Upon completion of the last linear transformation, the controller 18 instruct the output controller 34 to output the last residue (viz., ciphered word) to external circuitry (not shown) via an output terminal 36.

The arrangement of FIG. 1 is applicable to decipherment by which the ciphertext is transformed into the corresponding plaintext. To this end, $(a_1, \ldots, a_k)$, $(b_1, \ldots, b_k)$, and $(N_1, \ldots, N_k)$ stored in the memory 14 in the above-mentioned encipherment are respectively replaced by:

$(1/a_k \bmod N_k, \ldots, 1/a_1 \bmod N_1)$;
$(-b_k/a_k \bmod N_k, \ldots, -b_1/a_1 \bmod N_1)$; and
$(N_k, \ldots, N_1)$.

The register 16 of the controller 18 stores k as in the encipherment.

After these preparations, the similar operations are implemented on each of the words applied to the arrangement of FIG. 1.

As mentioned above, if $N_1 = \ldots = N_k$ then the arrangement of FIG. 1 operates in exactly the same manner as the above-mentioned related art. Accordingly, $N_j < N_{j+1}$ should be satisfied (viz., $N_1 < N_2 < \ldots < N_k$) in the first embodiment. However, it is preferable to avoid such a restriction in a data communications system. This is because is $N_j < N_{j+1}$ then $N_1 < N_k$, thus, the number of digits of the ciphertext becomes larger than that of the plaintext. This means that the data transmission rate is undesirably lowered.

A second preferred embodiment is to overcome this difficulty of the first preferred embodiment.

The principle underlying the second embodiment will first be discussed. This principle is to extend the range defined by each of the plaintext and the ciphertext. In more specific terms, it is assumed that: (a) each range of the definition and the values in the linear transformation including the residue calculation is $\{0, \ldots, (N-1)\}$; and (b) the bit length of the key N is n. Under these assumptions, if the value of a given word applied to the linear transformation arrangement is equal to or greater than the value of the key N, the given value is outputted without being subject to any linear transformation. Contrarily, if the value of the given word applied to the linear transformation arrangement does not reach the value of the key N, the given word is enciphered (viz., undergoes the linear transformation). Thus, each range of the definition and the values in the linear transformation is extended to the maximum range of $\{0, \ldots, 2^n-1\}$.

However, in order to ensure the implementation of the linear transformation of the word whose value is equal to or exceeds the key N, a code converter is provided prior to the linear transformation arrangement wherein "multiplication", "addition" and "division" are carried out. The code converter converts each of the word's values applied thereto into a predetermined value. More specifically, the code converter is able to make smaller the value of the word, which is equal to or exceeds the value of the key N, than the value of the key N. Accordingly, if the word, which has bypassed the linear transformation arrangement, is applied to the code converter, the word in question is subject to the linear transformation without failure.

One example of the second embodiment will be discussed with reference to FIG. 2.

Figure 2:
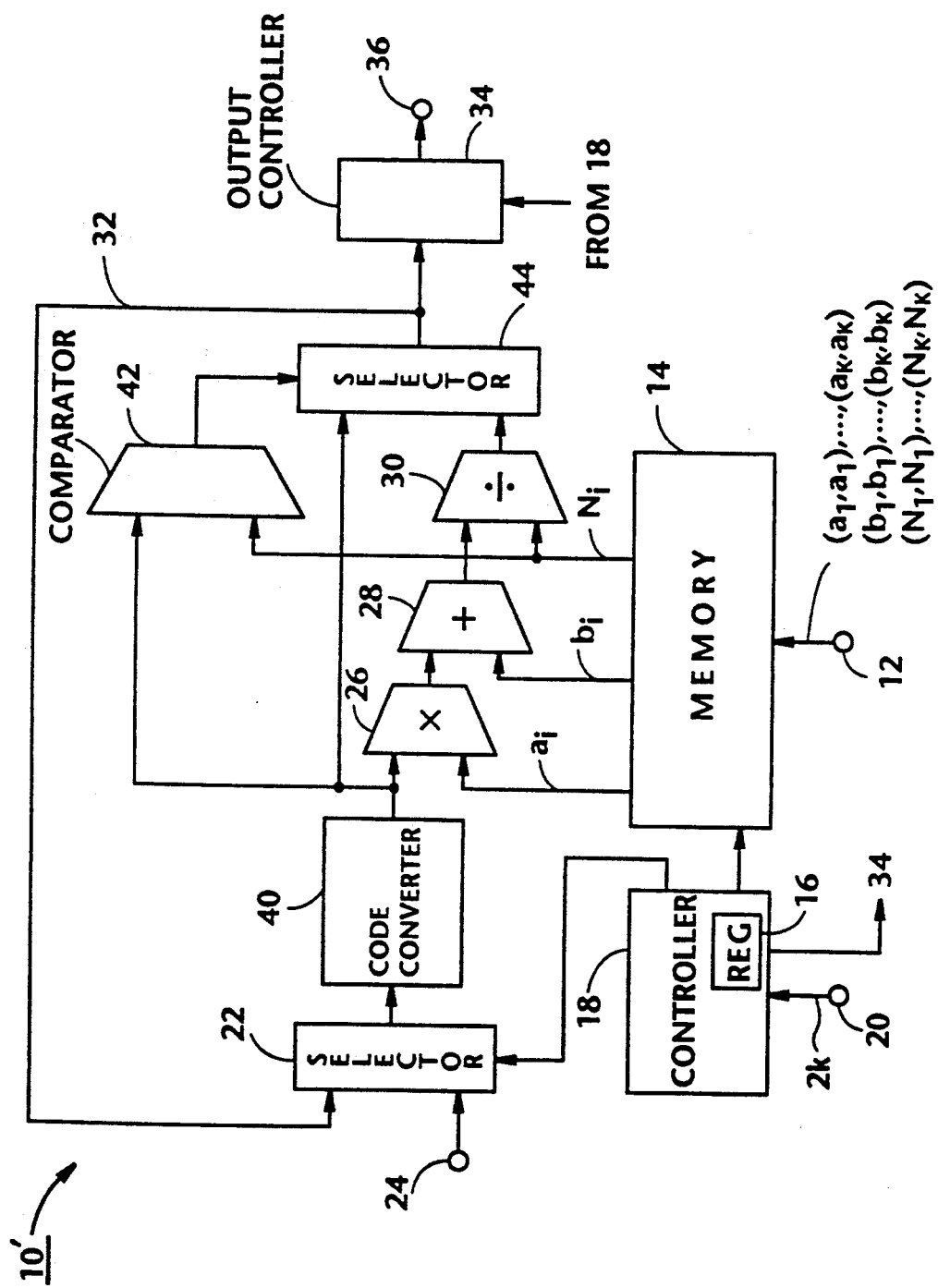
FIG. 2 is a block diagram schematically showing a second embodiment of the present invention.

As shown, the arrangement of FIG. 2 differs from that of FIG. 1 in that the former arrangement further includes a code converter 40, a comparator 42, and a selector 44. Other than this, the arrangement of FIG. 2 is essentially identical to that of FIG. 1. However, before implementing encipherment, the memory 14 of FIG. 2 stores $(a_1, a_1), \ldots, (a_k, a_k), (b_1, b_1), \ldots, (b_k, b_k)$, $(N_1, N_1), \ldots,$ and $(N_k, N_k)$ all of which are applied to the memory 14 via the input terminal 12. Further, in the second embodiment shown in FIG. 2, the register 16 stores 2 k which is applied thereto via the input terminal 20.

It is assumed that each of the words and the keys $N_1$ and $N_2$ has a bit length of 64. Further, it is assumed that the most significant bit (MSB) of the key N is a logic 1. Thus, if the code converter reverses the MSB of the word applied thereto, the word whose value is equal to or exceeds the value of the key $N_1$ or $N_2$, is rendered less than the value of the key.

Before plaintext is applied to the arrangement of FIG. 2 (depicted by numeral 10'), a plurality of cryptographic keys $(a_1, a_1), \ldots, (a_k, a_k), (b_1, b_1) \ldots, (b_k, b_k)$, and $(N_1, N_1) \ldots, (N_k, N_k)$ are applied to the memory 14 and then stored therein. Further, the number of repetitive operations of linear transformation (2 k) is applied to the controller 10 and then stored in the register 16. The words are sequentially applied to the arrangement of FIG. 2.

After these preparations, when one word included in the plaintext is applied to the selector 22 via the input terminal 24, the controller 18 allows the selector 22 to apply the word to the code converter 40. Further, the controller 10 controls the memory 14 such as to apply $a_1$, $b_1$, and $N_1$ to the multiplier 26, an adder 28, and a divider 30, respectively.

The multiplier 26 multiplies the output of the code converter 22 by the key $a_1$, and applies the product to the adder 28. Subsequently, the adder 28 adds the key $b_1$ to the output of the multiplier 26, after which the divider 30 divides the output of the adder 28 by the key $N_1$ and outputs the residue of the dividing operation. The residue thus obtained is applied to the selector 44.

On the other hand, the output of the code converter 40 is applied to the comparator 42 and the selector 44. Further, the key $N_1$ is applied to the comparator 42. If the output of the code converter 40 is equal to or exceeds the key $N_1$, the selector 44 selects the output of the code converter 40 which is fed back to the converter 40. Otherwise, the selector 44 selects the residue from the divider 30 and applies same to the code converter 40 via the selector 22 as mentioned above with respect to the first embodiment.

As mentioned above, if the selector 44 selects the output of the code converter 40, then the next time the selector 44 selects the output of the divider 30.

The controller 18 allows the output controller 34 to pass therethrough the output of the selector 44 only if the number of the repetitive linear transformations reaches $2(k-1)$ or 2 k and simultaneously if the selector 44 selects the output of the divider 30.

In the event that $2k > 2$, the above-mentioned operations are repeated wherein the keys $a_2$, $b_2$, and $N_2$ stored in the memory 14 are applied to the blocks 26, 28, and 30, respectively, in a manner similar to the first case.

Upon completion of the last linear transformation, the controller 18 instruct the output controller 34 to output the last residue (viz., ciphered word) to external circuitry (not shown) via an output terminal 36.

Figure 3:
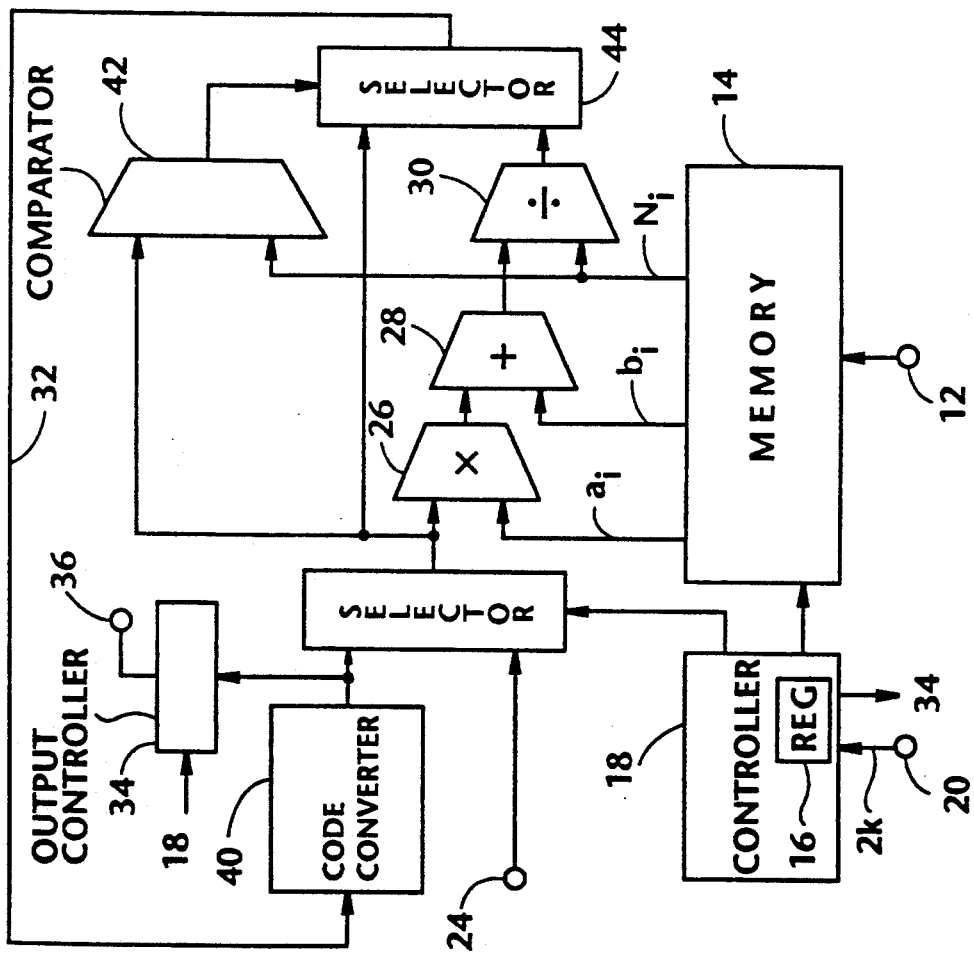
FIG. 3 is a block diagram schematically showing a third embodiment of the present invention.

FIG. 3 is a block diagram schematically showing the third embodiment of the present invention.

In the arrangement of FIG. 3, the code converter 40 is provided between the two selectors 22 and 34. The third embodiment is such as to implement the code conversion after the operations of comparator 42. The operations of the third embodiment will be understood from the descriptions of the second embodiment, and hence further discussion will not be given merely for the sake of brevity.

In the second and third embodiments, if the controller 18 is able to retrieve the same key two times, then it is no longer necessary to store the two identical keys.

It will be understood that the above disclosure is representative of several possible embodiments of the present invention and that the concept on which the invention is based is not specifically limited thereto.

What is claimed is:

1. A hardware arrangement for transforming plaintext into corresponding ciphertext, said plaintext including a plurality of words each having a predetermined bit length, said hardware arrangement sequentially acquiring said words and exhibiting a predetermined number of arithmetic operations on the word acquired, each of said arithmetic operations including a plurality of arithmetic processes, said hardware arrangement outputting an enciphered word therefrom when completing said predetermined number of arithmetic operations, said hardware arrangement comprising:

first means arranged to receive first and second inputs and selectively output one of said first and second inputs, said first input corresponding to the word acquired;

second means coupled to receive the output of said first means, said second means multiplying said output of said first means by a multiplier and outputting a product therefrom;

third means coupled to receive said product, said third means adding said product and an addend and then outputting a sum; and fourth means coupled to receive said sum, said fourth means dividing said sum by a modulus and outputting a residue therefrom, the value of said modulus being subject to change at each of said arithmetic operations, said residue being applied to said first means as said second input, said residue being outputted from said hardware arrangement as the ciphered word when said predetermined number of arithmetic operations are completed.

2. A hardware arrangement as claimed in claim 1, wherein the value of said multiplier changes at each of said arithmetic operations.

3. A hardware arrangement as claimed in claim 1, wherein the value of said addend change at each of said arithmetic operations.

4. A hardware arrangement for transforming plaintext into corresponding ciphertext, said plaintext including a plurality of words each having a predetermined bit length, said hardware arrangement sequentially acquiring said words and exhibiting a predetermined number of arithmetic operations on the word acquired, each of said arithmetic operations including a dividing operation, said hardware arrangement outputting an enciphered word therefrom when completing said predetermined number of arithmetic operations, said hardware arrangement comprising:

first means arranged to receive first and second inputs and selectively output one of said first and second inputs, said first input corresponding to the word acquired;

second means coupled to receive the output of said first means, said second means changing a value of the output of said first means, the changing including an operation that the value of the output of said first means is rendered smaller than a modulus used in said dividing operation, said second means outputting an output of the value changed;

third means coupled to receive the output of said second means, said third means multiplying said output of said second means by a multiplier and outputting a product therefrom;

fourth means coupled to receive said product, said third means adding said product and an addend and then outputting a sum;

fifth means coupled to receive said sum, said fourth means dividing said sum by said modulus and outputting a residue therefrom, the value of said modulus being subject to change at each of said arithmetic operations;

sixth means coupled to compare the output of said second and said modulus, said sixth means outputting a control signal whose content varies depending on a result of the comparison; and seventh means coupled to receive the outputs of said second, fourth, and sixth means, said seventh means being arranged to select one of the outputs of said second and fourth means according to said control signal, said seventh means applying the selected output to said first means.

5. A hardware arrangement as claimed in claim 4, wherein the value of said multiplier changes at each of said arithmetic operations.

6. A hardware arrangement as claimed in claim 4, wherein the value of said addend change at each of said arithmetic operations.

* * * * *